United States Patent [19]

Dayan

[11] Patent Number: 5,110,141
[45] Date of Patent: May 5, 1992

[54] SPINDLE ASSEMBLY

[75] Inventor: Ami Dayan, Ra'anana, Israel

[73] Assignee: MSB Technologies Ltd., Kibutz Givat Brenner, Israel

[21] Appl. No.: 724,581

[22] Filed: Jul. 1, 1991

[30] Foreign Application Priority Data

Jul. 3, 1990 [IL] Israel ............................... 94955

[51] Int. Cl.$^5$ .................. H02K 7/09; F16C 33/74; F16J 15/40; F16K 41/00
[52] U.S. Cl. .............................. 277/9; 277/9.5; 277/11; 277/80; 384/133; 310/90.5
[58] Field of Search ............... 277/9, 9.5, 11, 32, 277/80; 384/133; 310/90.5

[56] References Cited

U.S. PATENT DOCUMENTS

| | | | |
|---|---|---|---|
| 3,612,630 | 10/1971 | Rosensweig | 310/90.5 |
| 3,726,574 | 4/1973 | Tuffias et al. | 277/80 X |
| 4,171,818 | 10/1979 | Moskowitz et al. | 277/80 |
| 4,309,040 | 1/1982 | Pierrat | 277/80 |
| 4,526,382 | 7/1985 | Raj et al. | 277/80 |
| 4,630,943 | 12/1986 | Stahl et al. | 277/80 X |
| 4,761,082 | 8/1988 | Gabelli | 277/80 X |
| 4,824,122 | 4/1989 | Raj et al. | 277/80 |
| 4,940,248 | 7/1990 | Kilthau et al. | 277/80 |

*Primary Examiner*—William A. Cuchlinski, Jr.
*Assistant Examiner*—James K. Folker
*Attorney, Agent, or Firm*—Ladas & Parry

[57] ABSTRACT

Apparatus for restricting magnetic oil to a desired location within a FFFB comprising selectably locatable stopper apparatus having a first location near the FFFB for enabling a vacuum to be produced and for restricting the magnetic oil within the FFFB during filling of the FFFB with the magnetic oil and a second location away from the FFFB when filling is not occurring and apparatus for moving the selectably locatable stopper apparatus between the first location and the second location.

13 Claims, 3 Drawing Sheets

SPINDLE ASSEMBLY

FIELD OF THE INVENTION

The present invention relates to ferrofluidic bearings generally.

BACKGROUND OF THE INVENTION

Ferrofluidic seals and bearings are known in the art and are described in U.S. Pat. Nos. 3,612,630 and 4,526,382. FerroFluid Film Bearings (FFFBs) use a magnetic oil, a ferrofluid, as a lubricating oil and use magnetic seals to maintain the oil inside the bearing.

Typically, FFFBs are utilized in a spindle assembly to support a spindle axis. The magnetic oil directly lubricates the spindle axis as it rotates within the FFFB; to do this, the magnetic oil is maintained within the FFFB through the action of a pair of magnetic seals.

To fill a FFFB of a spindle assembly with magnetic oil, the spindle axis is first placed into the FFFB. A vacuum is then generated in the volume of the FFFB and afterward, the magnetic oil is allowed to fill the FFFB. Any magnetic oil between the magnetic fields of the magnetic seals will remain within the FFFB. If the amount of magnetic oil within the magnetic field of a first one of the magnetic seals does not precisely match the amount within the magnetic field of a second magnetic seal, the oil will be attracted towards the second magnetic seal and will then spread outside of the second magnetic seal. To prevent this from happening, the entirety of the oil which is outside of a predetermined location in each magnetic seal is removed.

For FFFBs internal to a machine, the access to a magnetic seal internal to the machine is not free and therefore, the magnetic oil can not be removed to a predetermined location.

Ferrofluidics Corporation of Nashua, New Hampshire produces a spindle assembly with a single FFFB. The FFFB supports a large portion of the spindle axis and thus, a large amount of magnetic oil is needed to fill the volume between the magnetic seals.

SUMMARY OF THE INVENTION

It is an object of the present invention to provide a FFFB internal to a spindle assembly and method and apparatus for filling the FFFB.

There is therefore provided, in accordance with a preferred embodiment of the present invention, apparatus for restricting magnetic oil to a desired location within a FFFB comprising selectably locatable stopper apparatus having a first location near the FFFB for enabling a vacuum to be produced and for restricting the magnetic oil within the FFFB during filling of the FFFB with the magnetic oil and a second location away from the FFFB when filling is not occurring and apparatus for moving the selectably locatable stopper apparatus between the first location and the second location.

There is also provided, in accordance with a preferred embodiment of the present invention, a spindle assembly comprising a housing, a rotatable axle, at least one FFFB, located inside the housing, to be filled with magnetic oil, selectably locatable stopper apparatus having a first location near the FFFB for enabling a vacuum to be produced and for restricting the magnetic oil within the FFFB during filling of the FFFB with the magnetic oil and a second location away from the FFFB when filling is not occurring and apparatus for moving the selectably locatable stopper apparatus between the first location and the second location.

Moreover, in accordance with a preferred embodiment of the present invention, the spindle assembly also comprises apparatus for maintaining the stopper apparatus in the second location.

Furthermore, in accordance with a preferred embodiment of the present invention, the stopper apparatus comprises a nut and a stopper screwingly engaged to the rotatable axle. Preferably, the at least one FFFB includes a pole piece having a chamfer and wherein the stopper is shaped to match the chamfer.

Additionally, in accordance with a preferred embodiment of the present invention, the selectably locatable stopper apparatus are located within the spindle assembly and wherein the first and second locations are within the spindle assembly.

There is further provided, in accordance with a preferred embodiment of the present invention, a method of filling a FFFB, internal of a spindle assembly, with magnetic oil. The steps include the steps of engaging a stopper apparatus with a chamfered pole piece of the FFFB, creating a vacuum within the FFFB, filling the FFFB with a desired amount of magnetic oil and disengaging the stopper apparatus.

Finally, in accordance with a preferred embodiment of the present invention, the stopper apparatus is located within the spindle assembly.

BRIEF DESCRIPTION OF THE DRAWINGS

The present invention will be understood and appreciated more fully from the following detailed description taken in conjunction with the drawings in which:

FIG. 3 is a schematic illustration of an alternative embodiment of the present invention comprising the two FFFBs of FIG. 1 incorporated into a spindle assembly which does not include a motor.

DETAILED DESCRIPTION OF PRESENT INVENTION

Figure 1:
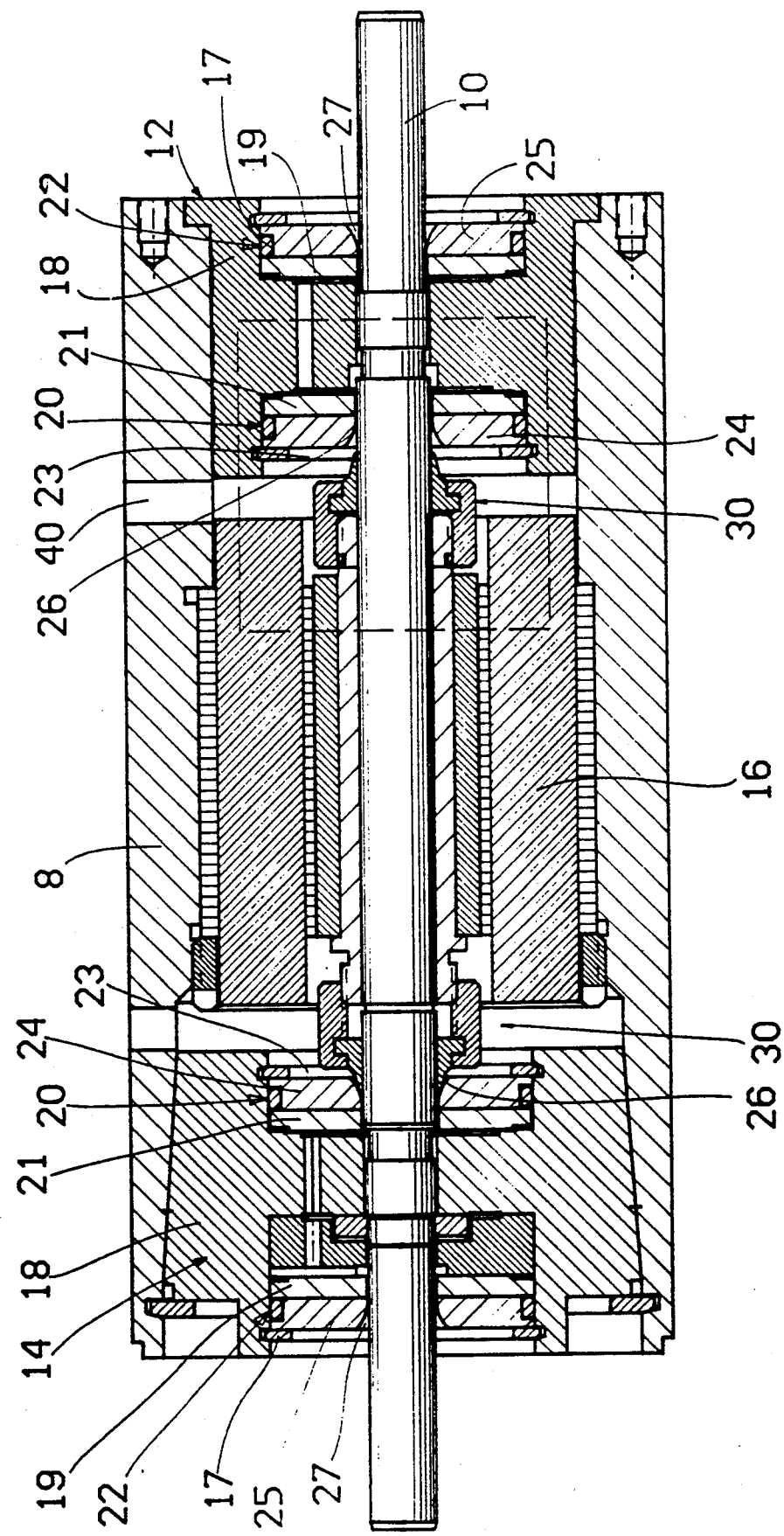
FIG. 1 is a schematic illustration of a spindle assembly comprising two FFFBs and a motor, constructed and operative in accordance with the present invention.

Reference is now made to FIG. 1 which illustrates a spindle assembly of the present invention. The spindle assembly comprises a housing 8 which houses a rotatable axle 10 supported by two FFFBs 12 and 14, similar to hydrodynamic bearings and utilizing magnetic oil, and rotated by a motor 16, such as a hysteresis motor. In contrast to prior art FFFBs, the FFFBs 12 and 14 are small and surround only a small portion of axle 10.

The FFFBs 12 and 14 each comprise a housing 18 and internal and external magnetic seals 20 and 22, respectively, for sealing magnetic oil within each FFFB 12 and 14. Each internal magnetic seal 20 comprises a magnet 21 and a pole piece 24 with a chamfer 26 and is retained by a retaining ring 23. Each external magnetic seal 22 comprises a magnet 19, a pole piece 25 with a chamfer 27 and is retained by a retaining ring 17. The magnetic oil is entered into the FFFBs 12 and 14 through chamfers 27.

For the following description, FFFB 12 will be used as an example. It will be appreciated that the operation for FFFB 14 is identical except where noted.

Axle 10 is first placed in its location within FFFB 12. Chamfer 26 is sealed, as described in more detail hereinbelow, and a vacuum is produced in the volume between seals 20 and 22. The magnetic oil is then introduced into the FFFB 12 through chamfer 27. From chamfer 27, the oil spreads throughout the FFFB 12 until the FFFB 12 is filled to the desired amount.

As is known in the art, the magnetic oil which is between the magnetic fields of magnetic seals 20 and 22 will be maintained within the FFFB 12. As mentioned hereinabove, the magnetic oil must fill chamfers 26 and 28 to a predetermined location so as to fill FFFB 12 up to the desired volume. Any oil outside of the predetermined location must be removed in some manner. Since, as can be seen in FIG. 1, the access to chamfer 27 is straightforward, any extra oil can easily be removed by an operator.

The magnetic oil is prevented from flowing past the predetermined location in chamfer 26 as follows in accordance with a preferred embodiment of the present invention: Before the vacuum is produced, a stopper apparatus 30 is brought into close engagement with the chamfer 26, as shown for FFFB 14 and as described in more detail hereinbelow.

The stopper apparatus 30 is shaped to ensure that the magnetic oil fills chamfer 26 up to the predetermined location. Once the entirety of the magnetic oil has been introduced into the FFFB 12 and any excess oil has been removed from chamfer 27, the stopper apparatus is disengaged from the chamfer 26 to the position shown in FIG. 1 for FFFB 12.

Figure 2A:
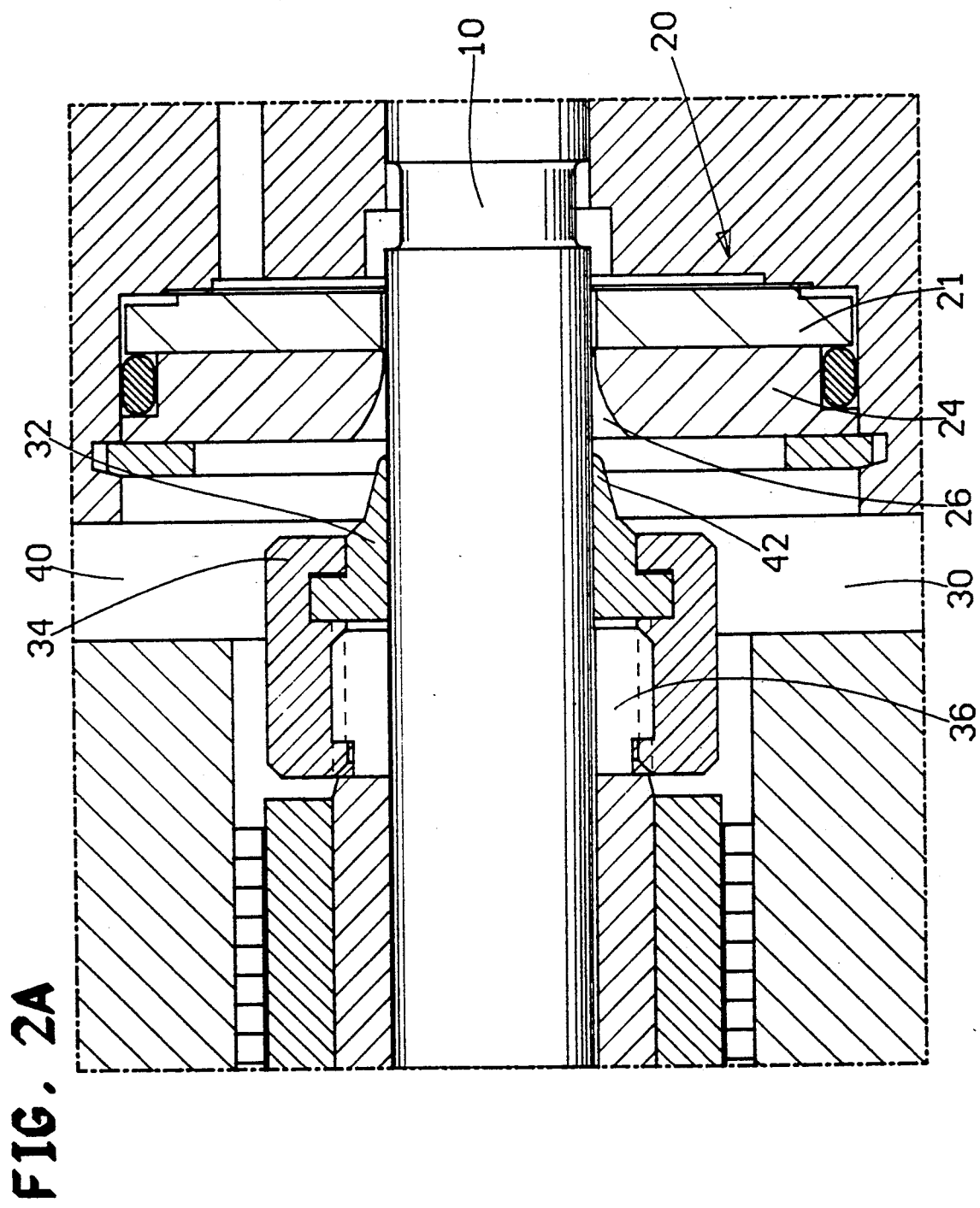
FIG. 2A is a detailed schematic illustration of a FFFB in the assembly of FIG. 1 before and after it is filled with oil.
Figure 2B:
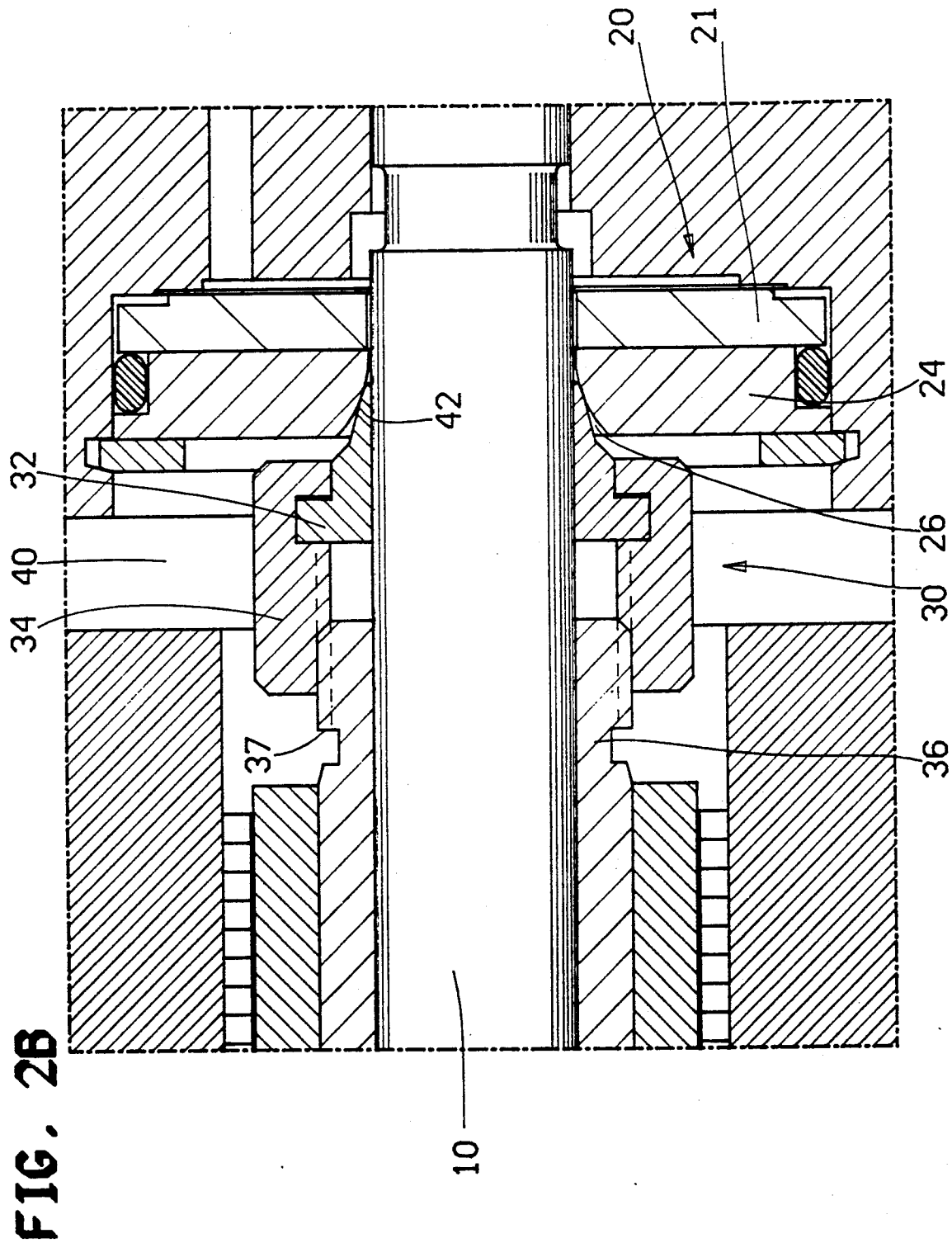
FIG. 2B is a detailed schematic illustration of the FFFB of FIG. 2A while it is being filled with oil.

Reference is now made to FIGS. 2A and 2B which detail the stopper apparatus 30 in a disengaged and an engaged position, respectively. The stopper apparatus 30 comprises a curved stopper 32, typically of rubber, for engaging with chamfer 26, and a nut 34, attached to curved stopper 32 for enabling the curved stopper 32 to move to and from chamfer 26. Nut 34 is screwingly engaged to axle 10 via a thread 36 machined into axle 10.

In the disengaged position, the nut 34 is screwed tightly to axle 10 and therefore, rotates with it. Typically, the direction of twist of thread 36 causes nut 34 to move towards the disengaged position. Since FFFBs 12 and 14 are opposite one another, the direction of twist of thread 36 for FFFB 12 is opposite that for FFFB 14.

When it is desired to move the stopper apparatus 30 from the disengaged position of FIG. 2A to the engaged position of FIG. 2B, the nut 34 is held from rotating with axle 10, typically by a wrench (not shown) which enters a hole 40 which extends through housing 8 (FIG. 1). The axle 10 is then rotated against the direction of twist of thread 36, causing the nut 34 and stopper 32 to advance toward the FFFB, which, for FIGS. 2A and 2B, is FFFB 12. The rotation of axle 10 is stopped once stopper 32 engages chamfer 26.

To disengage stopper apparatus 30 from chamfer 26, the axle 10 is rotated in a direction opposite that of the twist of thread 36 until the stopper apparatus 30 reaches an end 37 (FIG. 2B) of thread 36.

It will be appreciated that the stopper 32 and chamfer 26 are shaped to ensure that a tip 42 of stopper 32 will reach the predetermined location thereby to restrict the magnetic oil to filling up to the predetermined location.

It will be noted that the spindle assembly of the present invention is useful for a spindle with a motor 16 housed between two FFFBs 12 and 14. As shown in FIG. 3, it is also useful for a spindle assembly utilizing two FFFBs, marked 50 and 52, rather than a single long FFFB, as in the prior art. For this embodiment, the motor 16 is placed outside of the spindle assembly. In this manner, a long axle 10 can be supported.

It will be appreciated by persons skilled in the art that the present invention is not limited to what has been particularly shown and described hereinabove. Rather the scope of the present invention is defined only by the claims which follow:

I claim:

1. Apparatus for restricting magnetic oil to a desired location within a FFFB comprising:

selectably locatable stopper means having a first location near said FFFB for enabling a vacuum to be produced and for restricting said magnetic oil within said FFFB during filling of said FFFB with said magnetic oil and a second location away from said FFFB when filling is not occurring; and means for moving said selectably locatable stopper means between said first location and said second location.

2. A spindle assembly comprising:

a housing;

a rotatable axle;

at least one FFFB located inside said housing to be filled with magnetic oil;

selectably locatable stopper means having a first location near said FFFB for enabling a vacuum to be produced and for restricting said magnetic oil within said FFFB during filling of said FFFB with said magnetic oil and a second location away from said FFFB when filling is not occurring; and means for moving said selectably locatable stopper means between said first location and said second location.

3. A spindle assembly according to claim 2 and also comprising means for maintaining said stopper means in said second location.

4. A spindle assembly according to claim 2 and wherein said stopper means comprises a nut and a stopper screwingly engaged to said rotatable axle.

5. A spindle assembly according to claim 4 and wherein said at least one FFFB includes a pole piece having a chamfer and wherein said stopper is shaped to match said chamfer.

6. A spindle assembly according to claim 2 and wherein said selectably locatable stopper means are located within said spindle assembly and wherein said first and second locations are within said spindle assembly.

7. A spindle assembly according to claim 3 and wherein said selectably locatable stopper means are located within said spindle assembly and wherein said first and second locations are within said spindle assembly.

8. A spindle assembly according to claim 4 and wherein said selectably locatable stopper means are located within said spindle assembly and wherein said first and second locations are within said spindle assembly.

9. A spindle assembly according to claim 5 and wherein said selectably locatable stopper means are located within said spindle assembly and wherein said first and second locations are within said spindle assembly.

10. A method of filling a FFFB which is internal of a spindle assembly with magnetic oil including the steps of:
   engaging a stopper apparatus with a chamfered pole piece of said FFFB;
   creating a vacuum within said FFFB;
   filling said FFFB with a desired amount of magnetic oil; and
   disengaging the stopper apparatus.

11. A method according to claim 10 and wherein said stopper apparatus comprises a nut and a stopper engaged with an axle of said spindle assembly and wherein said nut is rotated with said axle thereby to engage said stopper apparatus with said FFFB.

12. A method according to claim 10 and wherein said stopper apparatus is located within said spindle assembly.

13. A method according to claim 11 and wherein said stopper apparatus is located within said spindle assembly.

* * * * *